United States Patent [19]

Kim et al.

[11] Patent Number: 5,767,228
[45] Date of Patent: Jun. 16, 1998

[54] AROMATIC POLYAMIDE PULP AND ITS PREPARING PROCESS

[75] Inventors: Jong Cheol Kim, Taegu; Hyeong Rack Lee; Jae Hyun Lee, both of Gumi; Seung Jo Lee; In Sik Han, both of Taegu; Du Hyun Kim; Seock Chul Ryu, both of Gumi; Won Jun Choe, Taegu; Young Hwan Park, Gumi, all of Rep. of Korea

[73] Assignee: Kolon Industries, Inc., Seoul, Rep. of Korea

[21] Appl. No.: 718,469

[22] PCT Filed: Apr. 10, 1995

[86] PCT No.: PCT/KR95/00037

§ 371 Date: Oct. 4, 1996

§ 102(e) Date: Oct. 4, 1996

[87] PCT Pub. No.: WO95/27750

PCT Pub. Date: Oct. 19, 1995

[30] Foreign Application Priority Data

| Apr. 9, 1994 | [KR] | Rep. of Korea | 1994/7426 |
| Dec. 9, 1994 | [KR] | Rep. of Korea | 1994/33493 |
| Dec. 26, 1994 | [KR] | Rep. of Korea | 1994/35815 U |
| Dec. 28, 1994 | [KR] | Rep. of Korea | 1994/37971 |

[51] Int. Cl.$^6$ ............................ C08G 69/28; C08G 69/32
[52] U.S. Cl. ..................... 528/329.1; 528/310; 528/312; 528/318; 528/321; 528/322; 528/332; 528/335; 528/336

[58] Field of Search ............................. 264/183, 184; 528/329.1, 335, 321, 336, 310, 312, 318, 322, 332

[56] References Cited

U.S. PATENT DOCUMENTS

| 4,971,744 | 11/1990 | Park et al. | 264/183 |
| 4,987,215 | 1/1991 | Keil et al. | 528/329.1 |
| 4,987,216 | 1/1991 | Keil et al. | 528/329.1 |
| 5,097,015 | 3/1992 | Miess et al. | 528/331 |

FOREIGN PATENT DOCUMENTS

0 511 753  3/1992  European Pat. Off.

*Primary Examiner*—P. Hampton-Hightower
*Attorney, Agent, or Firm*—Oblon, Spivak, McClelland, Maier & Neustadt, P.C.

[57] ABSTRACT

The present invention relates to an aromatic polyamide pulp and its preparing process which has both excellent physical properties and high degree of polymerization wherein aromatic diamine is reacted with aromatic diacid chloride in amides and/or urea-based polymerization solvent containing inorganic salts and/or a little of Lewis acid compound. The present invention can easily provide the pulp of high polymerization degree and high orientation by stirrer in the continuous transferable polymerization-orientation-gelation apparatus within a short time without use of a tertiary amine affecting human body and without regard to isotropic or anisotropic, and continuous or uncontinuous ejection.

12 Claims, 3 Drawing Sheets

AROMATIC POLYAMIDE PULP AND ITS PREPARING PROCESS

BACKGROUND OF THE INVENTION

1. Technical Filed

The present invention relates to an aromatic polyamide pulp and its preparing process, more particularly which has both excellent physical properties and high degree of polymerization wherein aromatic diamine is reacted with aromatic diacid chloride in amides and/or urea based polymerization solvent containing inorganic salts and/or a little of Lewis acid compound.

2. Description of the Related Art

Aromatic polyamide pulp has an excellent heat-resistance, chemicals-resistance, winding strength, modulus of elasticity and mechanical strength. So, it is used for manufacturing fiber reinforcing plastic molding product. Recently, it is used as an useful transfer material of asbestos regulating the use due to occurring pulmonary cancer.

Almost aromatic polyamide pulp, as disclosed on U.S. Pat. No. 3,767,756 has been prepared by dissolving aromatic polyamide polymer in sulfuric acid solvent to obtain a liquid crystalline spinning dope as optical anisotropy, spinning it to manner of wet or air gap wet to prepare polyamide filament, and shattering it. But, in case of this method there are problems that the apparatus system is very complicated and the operating control is difficult.

In order to solve the above problems, various new methods were developed as followings:

U.S. Pat. No. 4,511,623 discloses a process of polymerization characterized in which a tertiary amine is added into the amide solvent system. Japanese Published Patent No. 59-47694 discloses a process for preparing pulp particles by reacting monomers in amide solvent system to prepare polymer solution and directly precipitating and shattering the polymer in water or alcohol.

And, U.S. Pat. No. 4,876,040 discloses a process for preparing short fiber or pulp by extruding and spraying a liquid crystalline pre-polymer polymerized in amide solvent system containing inorganics salts, with a tertiary amine on pulped apparatus.

But, since U.S. Pat. No. 4,511,623 adds the amide solvent and excess tertiary amines simultaneously, the polymerization is rapidly terminated and control of the process becomes very difficult, and the gelled polymer also has molecular chains of orientation unit.

In fact, it is impossible to continuously produce fibers, particularly fibers having a high degree of polymerization which can maintain 5 hours, and re-preperation of pulp also is very difficult.

In case of Japanese Published Patent No. 59-47694, since polymer solution prior to gelation having a low inherent viscosity is broken into shatter, the final product has low inherent viscosity of 2.0~3.5. Therefore there is a problem that the properties are decreased.

In U.S. Pat. No. 4,876,040, even though there are no the above problems, the producing cost is high because of use of tertiary amines and there is a problem on environment as a nasty smell.

As a process for continuously preparing aromatic polyamide pulp, U.S. Pat. No. 5,028,372 discloses the process for preparing polyamide by continuously contacting aromatic diamine with aromatic diacid chloride in anhydride amide solvent system to obtain self-polymerizing solution, extruding the solution as belt-type on common extruding die to obtain optical isotropic liquid crystalline, and cutting the gel obtained by maturing to separate the desired pulp.

U.S. Pat. No. 5,106,560 discloses a process for preparing polyamide pulp by providing a polymerization solution for aromatic polyamide, pouring it on the inclined belt to get an oriented and matured gel, and separating the desired pulp from the gel.

But, these methods have problems as follows:

In case of U.S. Pat. No. 5,028,372 wherein the polymerization solution for polyamide was extruded on belt through extruding die under the definite inherent viscosity, when the pro-polymer solution is extruded through the die, since the solution is contacted with fixed-shape part and then the gelation is naturally occurred at the contacting zone, the small extruding holes on die were clogged due to gelation of polymer in the die or the extruding pathway becomes narrow.

So, it is not achieved to normally extrude the pre-polymer, and since the pre-polymer stays in reacting pipe for a long time over the defined term, it is very difficult to produce the final product due to the gelation of pre-polymer material.

In case of U.S. Pat. No. 5,106,560, since the orientation and maturing is made by gravity on inclined belt, it is impossible to produce the desired pulp having a high degree of orientation as a preferable property.

Korean Published Patent No. 92-4154 discloses a process for maturing anisotropic polymer solution by continuously extruding into container. But in this process, because the isotropic polymer solution is not pulp but powder, the properties of final product may be decreased. Also; in case of anisotropic polymer solution, in order to get anistropy, the viscosity must be over a definite level.

However, the preparing process becomes very difficult due to gelation of the polymer solution.

And, in order to Improve the inherent viscosity and orientation degree of polymer during maturing, it takes approximately 0.5~5 hours. Similarly, the degree of molecular orientation obtained by means of gravity shear is lower than that obtained by means of stirring, which results in decreased fibril growth in the final pulp and an increase in the time required for growth of fibrils having acceptable specific surface areas due to the low degree of orientation.

Korean Published Patent No. 90-4911 and other patents disclose processes for preparing pulp by extruding through orientation unit a liquid crystalline pre-polymer dope having an acceptable inherent viscosity before gelation and spraying and contacting into a tertiary amine solvent.

But, these methods have problems which gelation of the polymer solution is occured from wall of the orientation unit, so the unit is clogged.

SUMMARY OF THE INVENTION

It is an object of the present invention to provide an aromatic polyamide pulp avoided the aforesaid problems of prior art by an easy, stable and cheap process without using expensive tertiary amines and which avoids process line solidification problems due to gelation.

It is also an object of the present invention to continuously provide a high molecular weight aromatic polyamide pulp having excellent microfibril growth and sufficient length to be utilized as reinforcement materials.

The present invention provides a process for preparing aromatic polyamide pulps having repeating units of following formula (A) or (B) characterized by comprising the following steps:

(a) providing a polymerization solvent by adding inorganic salt and/or Lewis acid compound Into amide-based and/or urea-based organic solvent system;

(b) preparing the first solution by dissolving aromatic diamine, and then adding 20~50 wt % of a total 100 wt % amount of aromatic diacid chloride which will react with said aromatic diamine in equivalent mole;

(c) preparing the second solution by adding said first solution and the remainder 50~80 wt % of aromatic diacid dichloride in a continuous mixer simultaneously with mixing;

(d) pouring said second solution onto a means for continuous transferable polymerization-orientation-gelation;

(e) polymerizing and orienting the mixed solution obtained form said first solution and said second solution prior to gelation under stirring;

(f) maintaining said solution obtained in (e) to get a geled polymer which can be separated from the stirrer and the reacting container; and (g) separating said gelled polymer from the stirrer and the reacting container, and then maturing the obtained polymer and precipitating into a precipitating solution, and pulverizing and washing with water and drying in pulping machine.

$$\begin{array}{cccc} H & H & O & O \\ | & | & \| & \| \\ -N-R_1-N-C-R_2-C- \end{array} \quad (A)$$

$$\begin{array}{cc} H & O \\ | & \| \\ -N-R_3-C- \end{array} \quad (B)$$

Wherein, $R_1$, $R_2$ and $R_3$ are respectively an aromatic group selected from the group consisting of

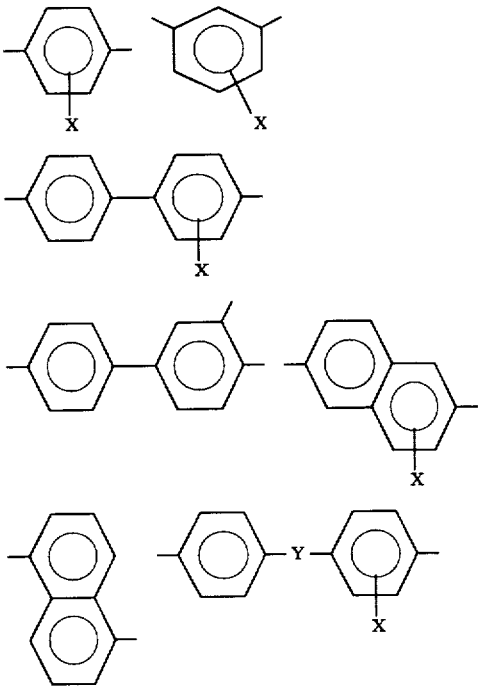

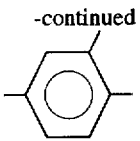

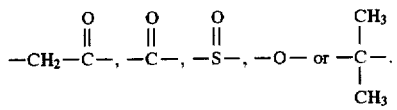

wherein, X is H, Cl, Br, I or $C_{1-4}$ alkyl or alkoxy group; and $$-CH_2-\underset{\|}{C}-, \ -\underset{\|}{C}-, \ -\underset{\|}{S}-, \ -O- \text{ or } -\underset{\underset{CH_3}{|}}{\overset{\overset{CH_3}{|}}{C}}-.$$

BRIEF DESCRIPTION OF THE DRAWING

FIG. 2 (b) is a rough-drawing for a means of continuous transferable polymerization-orientation.

FIG. 2 (c)~(i) are respectively rough-drawings for a means of continuous transferable polymerization-orientation applicable in the present invention.

A: aromatic diacid chloride in the first feeding step

B: aromatic diamine solution

C: aromatic diacid chloride in the second feeding step

D: The first solution

DETAILED DESCRIPTION OF THE INVENTION

The present invention relates to a process for preparing pulp from polymerization solution by a continuous polymerization process as improved in comparison with the known batch-type polymerization.

Generally, the batch-type polymerization process is carried out by adding polymerization solution, monomer, etc. onto one reactor, and then mixing, stirring and polymerizing the mixed solution.

Therefore, in order to give a continuity on the preparing process the reacting containers must successively be arranged in accordance with the desired process.

But, in case of this process, it is difficult to obtain a predetermined properties of polymer, so the productivity is decreased. In order to take out the reactants in the reactor, it is impossible to open and close the cap of reactor because the cap is attached with that of stirrer, feeding pipe of polymerization solvent and monomer and other system lines.

But, according to the present invention, the feeding steps of polymerization solvent, monomers and so on as prior step of pulp preparation are carried out continuous process, and then the polymerization and orientation are carried out in a reactor of opening-type without any cap.

After gelation of the reactant, the gelled material is maintained for a predetermined time to separate the polymer from the reactor.

In the process of the present invention, all polymers become to a mass as soft gel by the viscosity after a predetermined time, and then the polymer is separated from the stirrer and the reactor according to the property of which the polymer does not hold on the stirrer or the reactor. Therefore, because the polymerization and the orientation may be achived as best status by wing-type stirrer, pulp having both excellent physical properties and a high degree of polymerization may be prepared, as well as the greatest of molecular orientation as an indispensable condition for preparing pulp.

Figure 1:
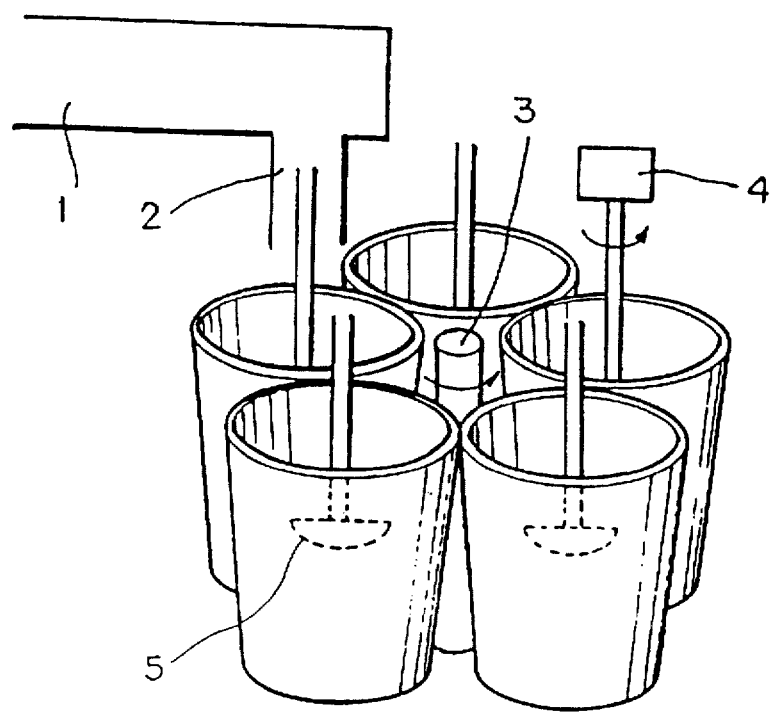
FIG. 1 is a rough-drawing for a means of continuous transferable polymerization-orientation-gelation equipment used in the present invention.

FIG. 1 represents a rough-drawing for processes of polymerization orientation and gelation.

In FIG. 1, each reactors of continuous transferable polymerization-orientation-gelation apparatus may be moved to up and down and rotated, wherein the reactor's revolution to center of rotating shift (3) may be moved continuously or discontinuously. Then, the revolution rate can be controlled by a-controller and RPM of the driving motor (4) on stirrer may be controlled by changeable system.

Figure 2:
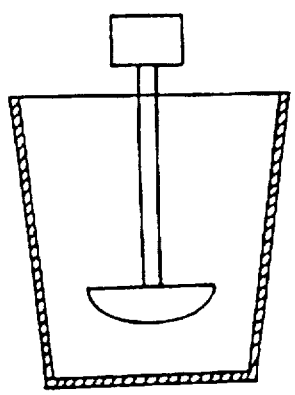
FIG. 2 (a) is a rough-drawing for a means of continuous transferable polymerization-orientation comprising anchor-type stirrer and reacting container.
Figure 2:
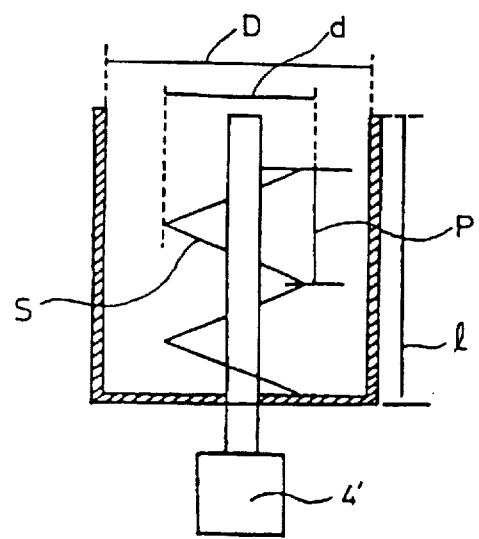
Figure 2:
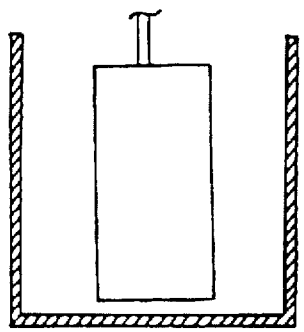
Figure 2:
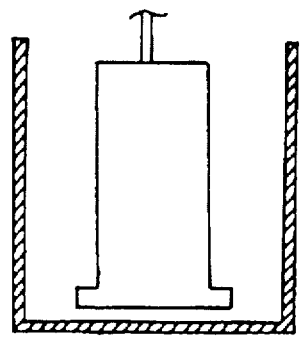
Figure 2:
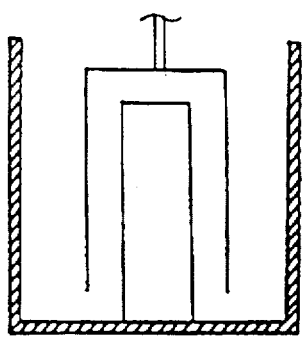
Figure 2:
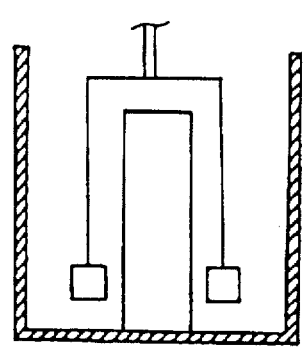
Figure 2:
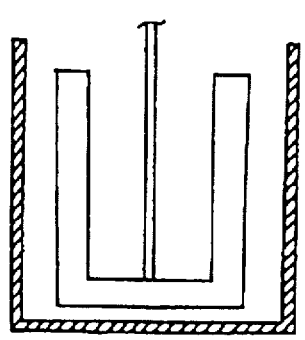
Figure 2:
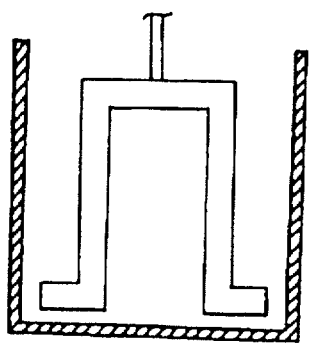
Figure 2:
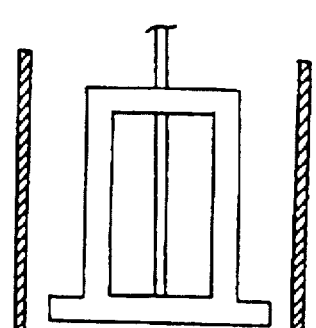

According to the present invention, various kind of stirrers can be used as shown in FIG. 2 (a)~(i), wherein anchor-type stirrer of FIG. 2 (a) or screw-type stirrer of FIG. 2 (b) may be used preferably.

In various reactor, when the impeller of anchor-type is used, the apparatus as shown in FIG. 2 (a) having wide-upper part and simultaneously narrow-lower part is effectively used for separating the geled polymer from the reactor.

In the present invention, amide-based or an urea-based organic solvent system, or mixture thereof, are used as the polymerization solvent. Any wt % mixture may be used.

Preferred amide-based or urea-based organic solvents used in the invention include, for example, N-methyl-2-pyrrolidinone(NMP), N,N-dimethyl acetamide(DMAc), hexamethylphosphoamide(HMPA), N,N-dimethylformamide(DMF), N,N,N',N'-tetramethylurea (TMU) or combinations thereof.

One or more inorganic salts may be added to the above organic solvent system in order to increase the solubility of the eventual polymer. Preferred inorganic salts include metal halides or alkali earth metal halide salts such as $CaCl_2$, LiCl, NaCl, KCl, LiBr, KBr, and so forth.

A single salt or a mixture of inorganic salts may be added.

The amount of inorganic salts added to the solvent is preferably less than 12 wt % based on the total weight of polymerization solvent.

When the amount of inorganic salts is more than 12 wt %, it is not economical because further desired effects are not achieved.

A small amount of one or more Lewis acids may be added to the polymerization solvents in addition to the inorganic salt(s) in order to further increase the solubility of the polymer. Preferred Lewis acid compounds are selected from the group consisting of compounds of halogen atoms and transition metals, and compounds of halogen atoms and Group III A, IV A, V A and VI A atoms of the periodic table, including $BF_3$, $BCl_3$, $AlCl_3$, $MgCl_2$, $FeCl_2$, $FeCl_3$, $ZnCl_2$, $SbCl_2$ and $HgCl_2$. The amount of Lewis acid added is preferably from 0.1 to 5 wt % on the basis of the total weight of polymerization solvent.

When the amount of Lewis acid is less than 0.1 wt %, the increase in the solubility of the final polymer and its molecular weight is no more than that obtained with the simple addition of inorganic salts.

When the amount of Lewis acid is more than 5%, while the solubility and molecular weight is increased, it is not economical.

According to the present invention, when mixtures of inorganic salts are used with Lewis acids, the inherent viscosity of the pulp is increased due to an increase in solubility as compared with the case of using only inorganic salt(s).

After preparing aromatic diamine solution by dissolving in the polymerization solvent, the solution of a predetermined amount and temperature is continuously transfered/feeding into the mixer by use of a fixed quantity feeding apparatus and a temperature control device. The mixture is cooled at 0° C.~20° C. by cooling medium. When the cooling temperature is below 0° C., salts dissolved in the solution may be precipitated.

And when the cooling temperature is over 20° C., the reaction rate during reaction with diacid chloride in followed step becomes rapid, and a side reaction may be occurred because the temperature of reaction system is increased over 50° C. by heat of reaction with diacid chloride.

According to the present invention, after cooling said aromatic diamine solution, 20~50 wt % of a total 100 wt % of aromatic diacid chloride is continuously/determinatively added and reacted to obtain the first solution. The process of adding the aromatic diacid dichloride is preferably carried out at a temperature of 0° C.~30° C.

When the temperature of reacting solution is more or less than the above range, the stirring and orientation time is unsatisfied in polymerization step due to rapid reaction, or the degree of polymerization may not be increased due to a side reaction, furthermore a pulp having the desired properties cannot be obtained.

The first solution and remainder 50~80 wt % of aromatic diacid dichloride are then simultaneously added to a continuous mixer using a pump and a temperature controller, and mixed to provide the second solution.

Wherein the continuous mixer is used for preventing the used apparatuses from corrosion due to an aromatic diacid chloride steam of melting status, but it is not necessary by all means. Especially, two-shaft stirrer of self-wiping type or self-cleaning type having a mixing and transferring function may preferably be used as one or two sets.

Figure 3:
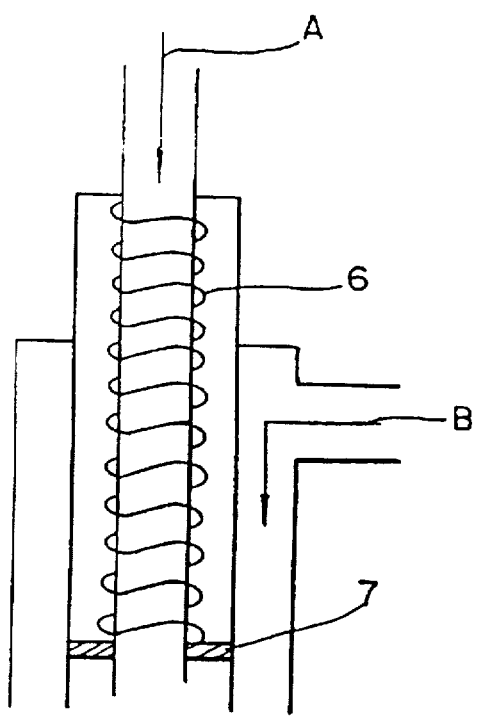
FIG. 3 represents an ejecting depiction of raw material into mixer during the first solution preparing step.
Figure 4:
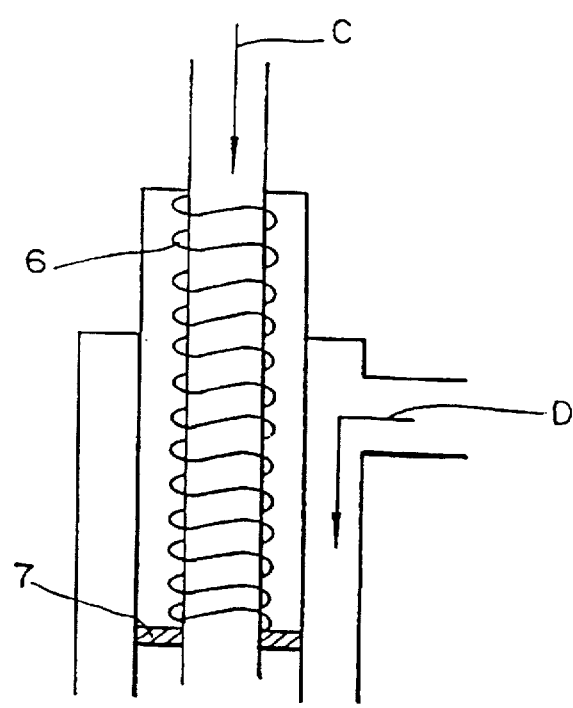
FIG. 4 represents an ejecting depiction of raw material into mixer during the second solution preparing step.

The mixing-reacting process in the continuous mixer is satisfactively carried out for about 5 seconds~3 minutes, as a time for uniformly mixing the mixture, but the reaction time may be changed in accordance with length and diameter of the polymerization-orientation apparatus, diameter of wings of the screw and rotation rate because the conditions have an effect on the reaction time for gelation. Then, in order that the mixing process is uniformly finished for a short time, it is profitable that the reactants during the preparation of the first solution and the second solution is poured at the same direction as shown in FIG. 3 and FIG. 4.

The tube feeding aromatic diacid chloride (A) is wound by heat wire (6) in order to prevent the melted aromatic diacid chloride from solidification due to influence of outside temperature, and then a system with mixing and ejecting function is used as the continuous mixer for continuoulsy preparing the second solution.

If the above aromatic diacid chloride is added by one step, an ununiformed mixture is obtained due to a rapid reaction so that the properties of final polymer became poor. Therefore, in order to mix uniformly the added materials, it is preferable to add the aromatic diacid chloride by two step as the process in the present invention. The second solution uniformly mixed is ejected into the reactor of continuous transferable polymerization-orientation-gelation apparatus through the outlet of the continuous mixer and is polymerized by use of a stirrer prior to be gelated. In order to recover continuously the uniform product from the polymerization-orientation-gelation apparatus. it is preferable to recover upon rating slowly the stirrer.

As the result of polymerization under stirring. the maximum molecular orientation may be achieved to the rotating direction of the stirrer as well as the degree of polymerization is increased.

In the present invention. the stirring for polymerization and orientation is caiired out before the gelation. in order that it is avoid to become bad of molecular orientation due to pulverization of the polymer stirring to gelation.

The polymer stirred before the gelation is maintained over 10 seconds. preferably below 10 minutes without stirring process so that the geled polymer can be separated from the stirrer and the reactor.

Then. the gelled polymer. according to the impeller types of stirrer. can be separated by each of other processes. That is, after separating the stirrer. they can be separated by overturning the reactor; and after separating the reactor. the polymer may be separated from the stirrer.

For example. in case of screw-type stirrer. it is profitable for working that after separating the reactor. The polymer is separater from the screw.

In case of anchor-type stirrer. it is profitable that after separating the stirrer the polymer may easily be separated by overturning the polymerization reactor.

The polymer obtained in accordance with the present invention has a merit of which it is almost separated as remainder of below 0.5 wt % after separating from the reactor and the stirrer.

According to the present invention. since the degree of polymerization on the polymer surface is able to be decreased when the polymer is reacted with moisture in atmosphere due to an incompleted solidation of said gelled polymer. it is profitable that the obtained polymer is cut in a proper size under the condition not to be moisture.

The cutting process can be carried out before and/or after maturing. in order to reduce the maturing time it is good to preferentially carry out the cutting process before maturing.

The obtained polymer may preferably be matured at a temperature of 25°~150° C. When the maturing temperature is less than 25° C., the time required for maturing is extended. and when it is more than 150° C., the inherent viscosity of the final pulp is decreased. By the solidification of polymer according to the above maturing process. the inherent viscosity and the molecular orientation of the polymer is more increased.

The matured polymer is precipitated into a precipitating solution and then the polymerization solvent is leached from the polymer. Wherein. water or a mixed aqueous solution containing 0~40 wt % of inorganic salts and polymerization solvent that are obtained from said leaching process of polymerization solvent may be used. In order to reduce the corrosion of apparatus. the neutralization on the solvent leaching process is preferable.

The leaching process of polymerization solvent must be carried out before the pulping process. because if the polymer is pulped before the leaching process. the properties of pulp such as fibrilizing and the like are decreased.

The polymer leached according to the above process is mixed with said precipitating solution in pulping apparatus, and then pulverized and dried to prepare the desired polyamide pulp. Wherein a mixed aqueous solution is used more preferable than water of pure as said precipitating solution to improve the properties of final pulp.

The concentration of polymer is preferably about 3~15 wt % based on the polymerization solvent. When the concentration of polymer is less than 3 wt %, it is not economical due to the low concentration although it is possible to produce a pulp having high inherent viscosity, and when the concentration of polymer is more than 15 wt %, the solubility is decreased and it is difficult to prepare a pulp having a high inherent viscosity.

The present invention can easily provide the pulp of high polymerization degree and high orientation by stirrer in the continuous transferable polymerization-orientation-gelation apparatus within a short time, without use of a tertiary amine affecting human body and without regard to isotropic or anisotropic. and continuous or uncontinuous ejection. The present invention is also to provide a continuous process of batch-type polymerization to be able to give the maximum polymerization and orientation in opening system but preferable in dried circumstance. because the polymer has the property that that it is easily separated from the reactor without any effort under a predetermined gelation.

The pulp prepared in accordance with the present invention has over 3.5 g/dl of the inherent viscosity, 250~500 ml of Canadian Standard Freenes, and over 5 m$^2$/g of specific surface area by nitrogen adsorption method.

The inherent viscosity (I.V.) of the pulp prepared in the present invention is calculated by following equation.

$$I.V. (g/dl) = \ln(\eta_{rel})/C$$

Wherein. C is the concentration of polymer solution (0.5 g of polymer is dissolved in 100 ml of 95~98% conc. sulfuric acid). and relative viscosity $\eta_{rel}$ is the ratio of flowing time measured by capillary viscometer using 95~98% conc. sulfuric acid as solvent.

The Canadian Standard Freeness was measured by the method of TAPPl standard T227 om-85. and the specific surface area was measured by the method of ASTM C-699-79.

The present invention is illustrated by the following examples. but should not construed to be limited thereto.

EXAMPLE 1

After the temperature of a reactor in which 1.000 kg of N-methyl-2-pyrrolidone was added, was controlled to 80° C., 80 kg of $CaCl_2$ was added thereto. stirred and completely dissolved.

To the above polymerization solvent was added 48.67 kg of melting p-phenylene diamine. stirred and dissolved to prepare the solution of aromatic diamine.

The above amine solution was added at the rate of 1128.67 g/min using a quantative pump to a mixer controlled at the temperature of 5° C. using a temperature controller, and simultaneously melted terephthaloyl chloride was added thereto at the rate of 27.41 g/min and mixed and reacted to prepare the first mixed solution.

After controlling the temperature of the first mixed solution to 5° C., it was added into a continuous mixer at the rate of 1156.08 g/min. and then more melted terephthaloyl chloride was simultaneously added at the rate of 63.95 g/min to mix for 30 sec as staying time of solution in the continuous mixed as shown in FIG. 4.

Then the temperature of solution in the continuous mixer was controlled below 60° C.

As shown in FIGS. 1 and 2(a), the obtained solution was poured into the reacting container of a continuous transferable polymerization-orientation-gelation apparatus from an outlet 2 via a feeder 1, and polymerized and oriented under stirring by an anchor-type stirrer 5 prior to being gelated. As shown in FIGS. 1 and 2(a), the obtained solution was poured into the reacting container of a continuous transferable polymerization-orientation-gelation apparatus from an outlet 2 via a feeder 1, and polymerized and oriented under stirring by an anchor-type stirrer 5 prior to being gelated.

The polymer was maintained for 5 min and matured to isolate from the reactor.

The above gelled polymer Was cut about 3 cm to length direction of fiber and below about 2 cm to thickness, and matured for 1 hour at at 100° C. It was precipitated into water and then the polymerization solvent was leached.

The obtained polymer was fed to a pulping machine, pulverized, water-washed and dried to prepare the desired poly(para-phenylene tere phthalamide) pulp.

The inherent viscosity of the pulp was 4~8 g/dl and Canadian Standrd Freeness was 348 ml.

The prepared conditions and the properties in accordance with Examples 2~7 and Comparative Examples 1-3 were as shown in following Table 1 and 2, wherein the conditions and the processes of examples not being written in Table 1 were the same with Example 1.

TABLE 1

| | Polymerization solvent | | | | |
|---|---|---|---|---|---|
| | NMP | amount of CaCl$_2$ | Lewis acid | | p-phenylene diamine |
| Section | (kg) | (kg) | Type | (kg) | (kg) |
| Example 1 | 1,000 | 80 | — | — | 48.67 |
| Example 2 | 1,000 | 80 | — | — | 48.67 |
| Example 3 | 800 | 60 | AlCl$_3$ | 10 | 48.67 |
| Example 4 | 1,200 | 80 | — | — | 48.67 |
| Example 5 | 1,200 | 40 | AlCl$_3$ | 20 | 48.67 |
| Example 6 | 800 | 50 | MgCl$_2$ | 10 | 48.67 |
| Example 7 | 1,000 | 80 | — | — | 48.67 |
| Comparative Example 1 | 1,000 | 80 | — | — | 48.67 |
| Comparative Example 2 | 1,000 | 80 | — | — | 48.67 |
| Comparative Example 3 | 1,200 | 80 | — | — | 48.67 |

| | Mixing | | | | |
|---|---|---|---|---|---|
| | 1st solution | | 2nd solution | | |
| Section | amount of amine solution (g/min) | amount of TPC (g/min) | 1st solution amount (g/min) | amount of TPC (g/min) | Mixing time of TPC (sec) |
| Example 1 | 1128.67 | 27.41 | 1156.08 | 63.95 | 10 |
| Example 2 | 1128.67 | 27.41 | 1156.08 | 63.95 | 10 |
| Example 3 | 918.67 | 27.41 | 946.08 | 63.95 | 10 |
| Example 4 | 1328.67 | 36.54 | 1365.21 | 54.82 | 30 |
| Example 5 | 1308.67 | 27.41 | 1336.08 | 63.95 | 20 |
| Example 6 | 908.67 | 31.98 | 940.65 | 59.38 | 20 |
| Example 7 | 1128.67 | 22.84 | 1151.51 | 68.52 | 10 |
| Comparative Example 1 | 1128.67 | 27.41 | 1156.08 | 63.95 | 30 |
| Comparative Example 2 | 1128.67 | 27.41 | 1156.08 | 63.95 | 10 |
| Comparative Example 3 | 1328.67 | 36.54 | 1365.21 | 54.82 | 30 |

TABLE 1-continued

| | Mixing | | | | |
|---|---|---|---|---|---|
| Section | Stirring | Maturing Time (min) | Time (min) | Temp. (°C.) | Precipitating water solution |
| Example 1 | ○ | 5 | 60 | 100 | water |
| Example 2 | ○ | 10 | 60 | 100 | NMP 40 wt % |
| Example 3 | ○ | 5 | 60 | 100 | water |
| Example 4 | ○ | 10 | 90 | 100 | NMP 30 wt % |
| Example 5 | ○ | 20 | 60 | 130 | water |
| Example 6 | ○ | 5 | 60 | 100 | NMP 20 wt % |
| Example 7 | ○ | 5 | 120 | 70 | water |
| Comparative Example 1 | x | — | 60 | 100 | water |
| Comparative Example 2 | x | — | 60 | 100 | water |
| Comparative Example 3 | x | — | 90 | 100 | NMP 30 wt % |

*NMP: N-Methyl-2-pyrrolidone
*TPC: Terephthaloylchloride
*NMP: N-methyl-2-pyrrolidone

TABLE 2

| | Properties | | |
|---|---|---|---|
| Section | I.V. | Canadian Standard Freeness | Formation |
| Example 1 | 4.8 | 348 | pulp |
| Example 2 | 4.9 | 309 | pulp |
| Example 3 | 4.1 | 482 | pulp |
| Example 4 | 5.5 | 274 | pulp |
| Example 5 | 5.9 | 305 | pulp |
| Example 6 | 4.5 | 447 | pulp |
| Example 7 | 5.2 | 322 | pulp |
| Comparative Example 1 | 3.7 | 783 | pulp |
| Comparative Example 2 | 2.9 | — | powder |
| Comparative Example 3 | 3.2 | — | powder |

EXAMPLE 8

After the temperature of a reactor which 1.000 kg of N-methyl-2-pyrrolidone was added, was controlled to 80° C., 80 kg of CaCl$_2$ was added thereto, stirred and completely dissolved.

To the above polymerization solvent was added 48.67 kg of p-phenylene diamine, stirred and dissolved to prepare the solution of aromatic diamine.

The above amine solution was added at the rate of 1128.67 g/min using a quantative pump to a mixer controlled at the temperature of 5° C. using a temperature controller, and simultaneously melted terephthaloyl chloride was added thereto at the rate of 27.41 g/min and mixed reacted to prepare the first mixed solution.

After controlling the temperature of the first mixed solution to 5° C., it was added into a continuous mixer at the rate of 1156.08 g/min, and then more melted terephthaloyl chloride was simultaneously added at the rate of 63.95 g/min to mix for 30 sec as staying time of solution in the continuous mixer.

The obtained solution was poured into the reactor of a continuous transferable polymerization-orientation-gelation apparatus of a rotation type wherein the apparatus has the screw-type stirrer with 10 cm in screw diameter (d) and screw 1 pitch (p) of 5 cm intervals and the tube-type reactor with 20 cm in inner diameter and 40 cm of length as shown in FIG. 2 (b). It was stirred at 200 RPM of screw rotating rate to polymerize and orient the polymer before gelation.

After maintaining for 5 min at 30° C., the polymer was ejected by rotating the screw, cut below about 3 cm in length direction of fiber and below about 2 cm in thickness, and matured for 2 hours at 80° C.

It was precipitated into water and then the polymerization solvent was extracted.

The obtained polymer was fet to a pulping machine, pulverized, water-washed and dried to prepare the desired poly(para-phenyleneterephthalamide) pulp.

EXAMPLE 9

The pulp was prepared by using the same manner as Example 8 except that the inner diameter of the tube-type reactor is 10 cm.

EXAMPLE 10

The pulp was prepared by using the same manner as Example 8 except that the inner diameter of the tube-type reactor is 30 cm.

EXAMPLE 11

The pulp was prepared by using the same manner as Example 8 except use of $CaCl_2$ 60 kg and $AlCl_3$ 10 kg instead of use of $CaCl_2$ 80 kg.

EXAMPLE 12

The pulp was prepared by using the same manner as Example 8 except use of $CaCl_2$ 60 kg and $MgCl_2$ 10 kg instead of use of $CaCl_2$ 80 kg.

As the results of Example 8–12 were as shown in Table 3.

TABLE 3

| Section | I.V. | Canadian Standard Freeness | Specific surface area |
| --- | --- | --- | --- |
| Example 8 | 4.9 | 282 | 8.7 |
| Example 9 | 4.0 | 399 | 7.2 |
| Example 10 | 4.3 | 345 | 8.1 |
| Example 11 | 5.8 | 317 | 9.2 |
| Example 12 | 6.0 | 335 | 9.1 |

EXAMPLE 13–16

The second solution was prepared by the same manner as Example 1. The second solution was poured into the reacting container of a continuous transferable polymerization-orientation-gelation apparatus from an outlet 2 via a feeder 1, and polymerized and oriented under stirring at 160 rpm by a stirrer as shown in FIGS. 2(c)-2(f) prior to being gelated. The obtained polymer was maintained for 5 min and matured to isolate from the reacting container. It was stirred at 160 rpm by the stirrer as shown in FIG. 2 (c)-(f) to polymerize and orient before gelation, and maintained and matured to isolate the polymer from the reactor.

The obtained polymer was separated to the upper part, the middle part and the lower part lower respectively, and each of the separated polymers was cut below about 3 cm in length direction of fiber and below about 2 cm in thickness to mature for 1 hour at 100° C. It was precipitated into water and then the polymerization solvent was extracted the obtained polymer was fet to a pulping machine pulverized, water-washed and, dried to prepare the desired Poly(Para-Phonylencterphalamide) pulp.

As the results were as shown in Table 4.

TABLE 4

| Section | Stirrer Type | Smaple Part | I.V. (ml) | Canadian Standard Freeness (ml) | Specific surface area $(m^2/g)$ |
| --- | --- | --- | --- | --- | --- |
| Example 13 | FIG. 2 (c) | Upper Part | 4.2 | 400 | 9.3 |
| | | middle Part | 4.3 | 410 | 9.3 |
| | | lower Part | 4.1 | 500 | 8.3 |
| Example 14 | FIG. 2 (d) | Upper Part | 4.2 | 450 | 9.5 |
| | | middle Part | 4.2 | 450 | 9.5 |
| | | lower Part | 4.2 | 450 | 9.5 |
| Example 15 | FIG. 2 (e) | Upper Part | 3.9 | 510 | 9.2 |
| | | middle Part | 3.9 | 510 | 9.2 |
| | | lower Part | 3.7 | 560 | 7.9 |
| Example 16 | FIG. 2 (f) | Upper Part | 4.4 | 440 | 10.1 |
| | | middle Part | 4.4 | 440 | 10.1 |
| | | lower Part | 4.4 | 440 | 10.1 |

[Note]
1. Reactor; diameter 210 mm, Stirrer: Outer diameter 160 mm
2. FIG. 2 (d)- Having a wing of 20 cm × 20 cm at lower surface of stirrer. FIG. 2 (e)- Having a wing of 40 cm × 20 cm at lower surface of stirrer.

What is claimed is:

1. A process for preparing an aromatic polyamide pulp comprising the following steps:
    (a) preparing a polymerization solvent by adding an inorganic salt, a Lewis acid compound, or a mixture thereof into an organic solvent system comprising a urea group-containing compound, an amide group-containing compound or a mixture thereof,
    (b) preparing a first solution by dissolving aromatic diamine in said polmerization solvent and then adding about 20–50 wt % of a total 100 wt % amount of aromatic diacid dichloride which will react with said aromatic diamine in equivalent mole;
    (c) preparing a second solution by adding said first solution and the remainder of about 50–80 wt % of aromatic diacid dichloride in a continuous mixer simultaneously with mixing;
    (d) pouring said second solution onto a means for continuous transferable polymerization-orientation-gelation which comprise a reacting container and a stirrer attached to said container;
    (e) polymerizing and orienting said second solution prior to gelation under stirring in said reacting container;
    (f) maintaining said solution obtained in (e) in said container to obtain a gelled polymer which can be separated from said stirrer and said reacting container; and
    (g) separating said gelled polymer from the stirrer and the reacting container, and then maturing the obtained polymer and precipitating into a precipitating solution, and to leach said polymerization solvent from said polymer, pulverizing and washing with water and drying in a pulping machine.

2. The process according to claim 1, wherein the first solution and the remainder 50–80 wt % of aromatic diacid dichloride is ejected in the same direction to uniformly mix.

3. The process according to claim 1, wherein the said stirrer has a screw shape.

4. The process according to claim 1, wherein said maintaining time for gelation is between 10 seconds and 10 minutes.

5. The process according to claim 1, wherein said precipitating solution is water or a mixture of water, polymerization solvent and inorganic salt.

6. The process according to claim 5, wherein the content of polymerization solvent and inorganic salt in said mixture is 40 wt % of total 100 wt % of the mixed precipitating solution.

7. The process according to claim 1, wherein said aromatic polyamide pulp is poly(para-phenyleneterephthalamide).

8. An aromatic polyamide pulp wherein the inherent viscosity is over 3.5 g/dl, Canadian Standard Freeness is about 250–500 ml, and the specific surface area by nitrogen adsorption method is over 5 $^2$/g.

9. The aromatic polyamide pulp according to claim 8, wherein the pulp is poly(para-phenyleneterephthalamide).

10. A process for preparing an aromatic polyamide comprising the following steps:

(a) preparing a polymerization solvent by adding an inorganic salt, a Lewis acid compound or a mixture thereof into an organic solvent system comprising a urea group-containing compound, an amide group-containing compound, or a mixture thereof;

(b) preparing a first solution by dissolving aromatic diamine in said polymerization solvent, and then adding about 20–50 wt % of a total 100 wt % amount of aromatic diacid dichloride which will react with said aromatic diamine in equivalent mole;

(c) preparing a second solution by adding said first solution and the remainder of about 50–80 wt % of aromatic diacid dichloride in a continuous mixer simultaneously with mixing;

(d) pouring said second solution onto a means for continuous transferable polymerization-orientation-gelation which comprise a reacting container and a stirrer attached to said container;

(e) polymerizing and orienting said second solution under stirring in said reacting container prior to gelation; and (f) maintaining said solution obtained in (e) in said container over 10 seconds to easily separate a polymer from the stirrer and the reacting container.

11. The process according to claim 10, wherein the maintaining time is between 10 seconds and 10 minutes.

12. The process according to claim 10, wherein the amount of the polymer remaining in the stirrer and the reactor after separating is below 0.5 wt % of total amount of the obtained polymer.

* * * * *